(No Model.) 4 Sheets—Sheet 1.
A. W. BUTT.
CULTIVATOR.
No. 440,135. Patented Nov. 11, 1890.
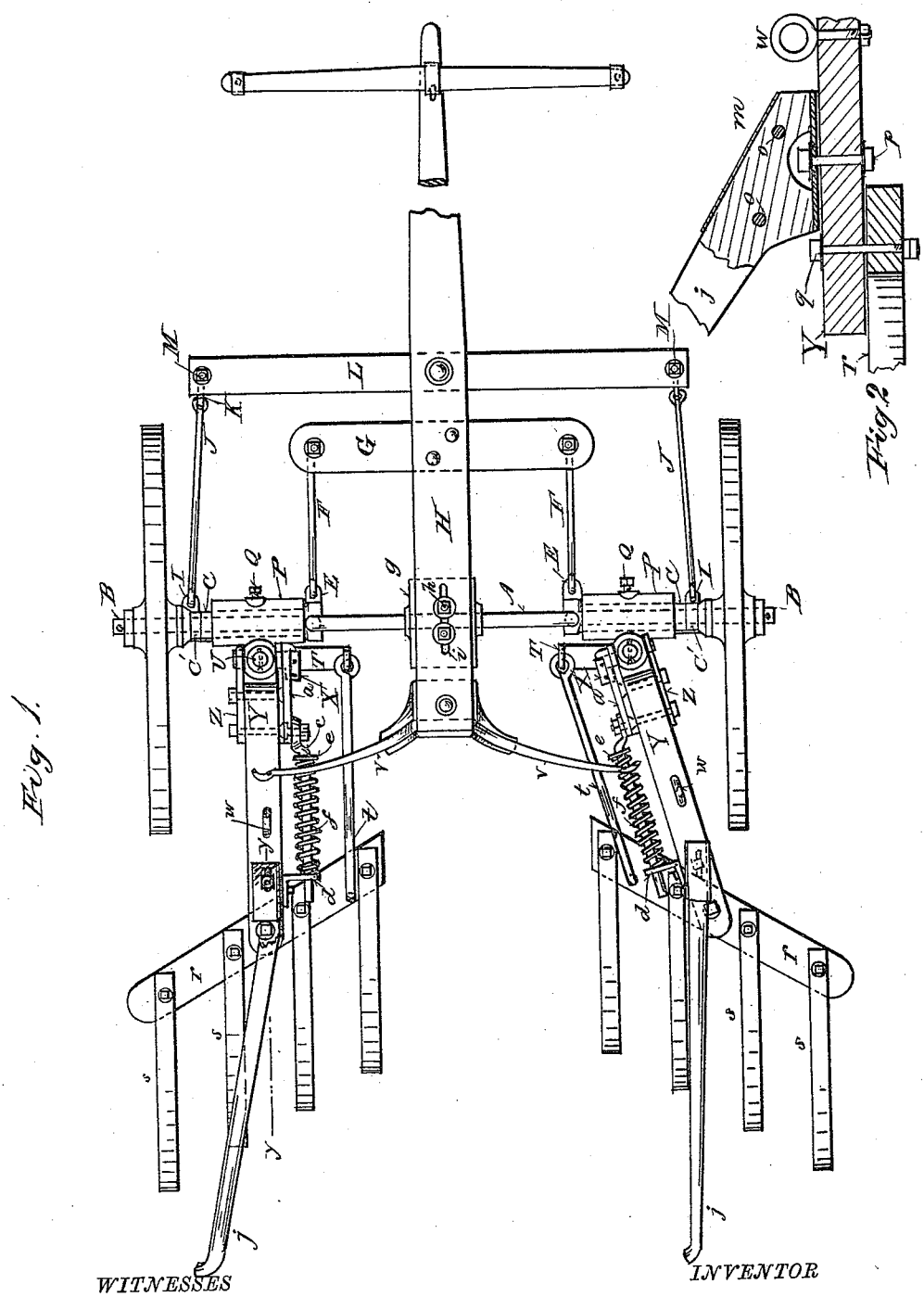
WITNESSES
INVENTOR
A. W. Butt
By H. A. Toulmin
his Attorney.

(No Model.) 4 Sheets—Sheet 2.
A. W. BUTT.
CULTIVATOR.
No. 440,135. Patented Nov. 11, 1890.
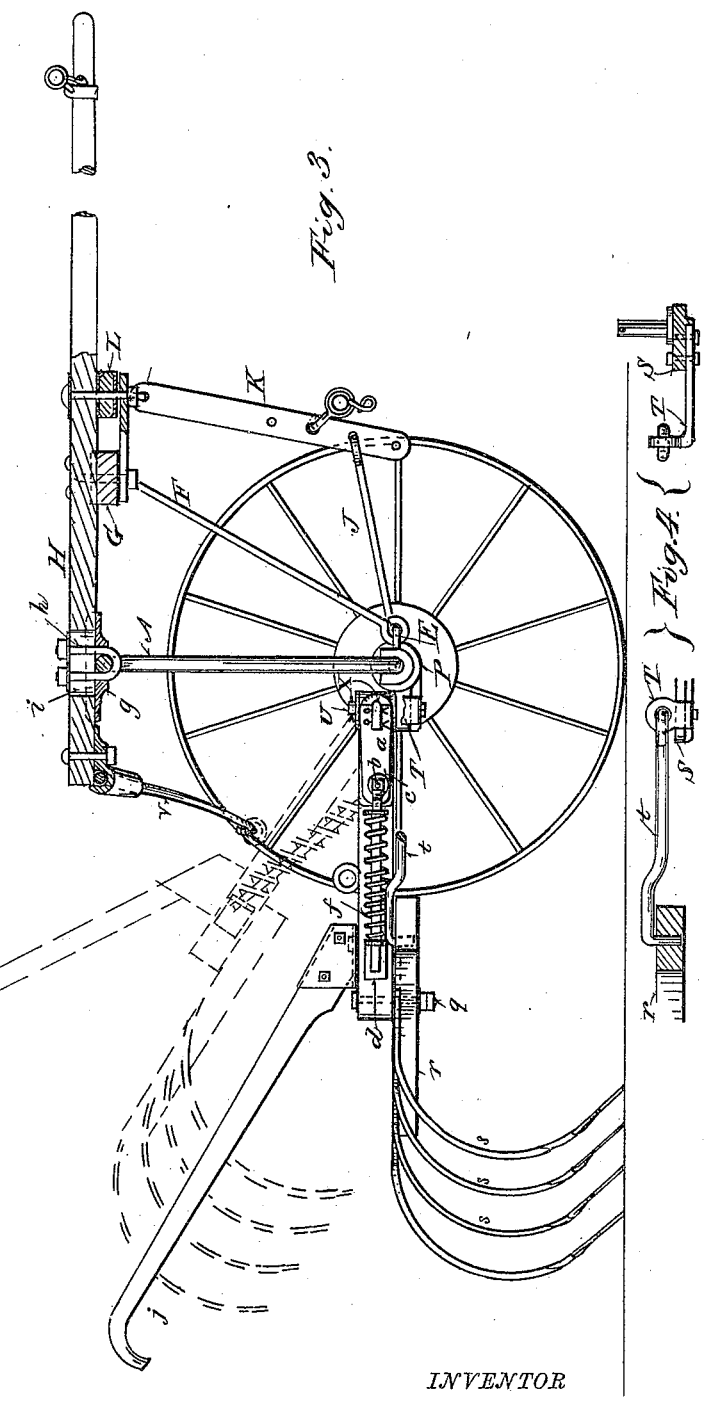
WITNESSES
H. M. Plaisted.
Warren Hull.
INVENTOR
A. W. Butt
By H. A. Toulmin
Her's Attorney.

(No Model.) 4 Sheets—Sheet 3.
A. W. BUTT.
CULTIVATOR.
No. 440,135. Patented Nov. 11, 1890.
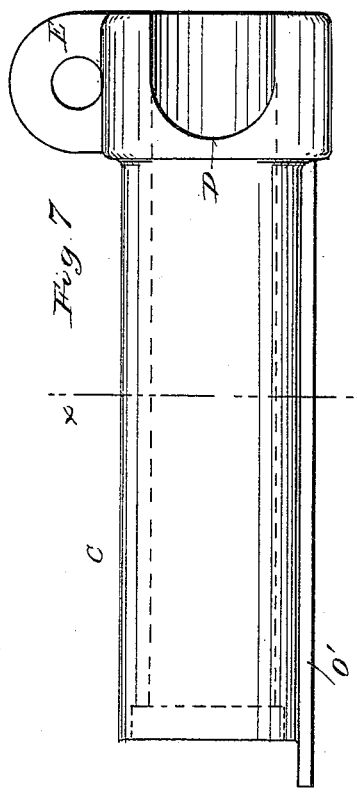
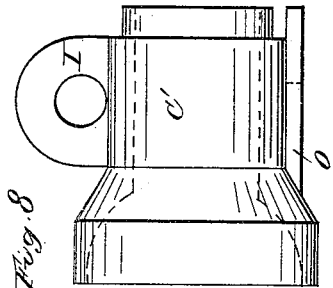
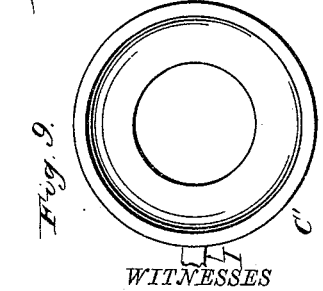
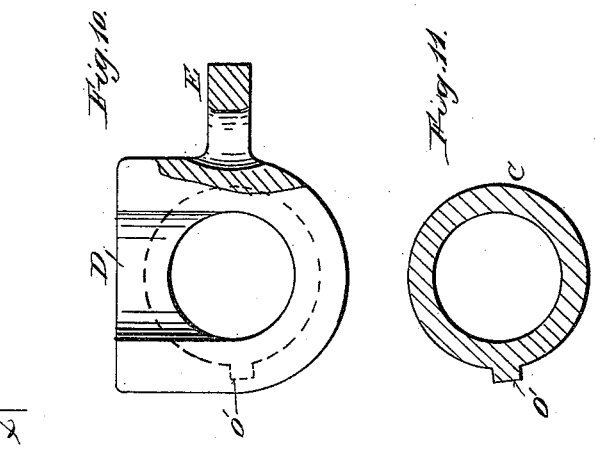
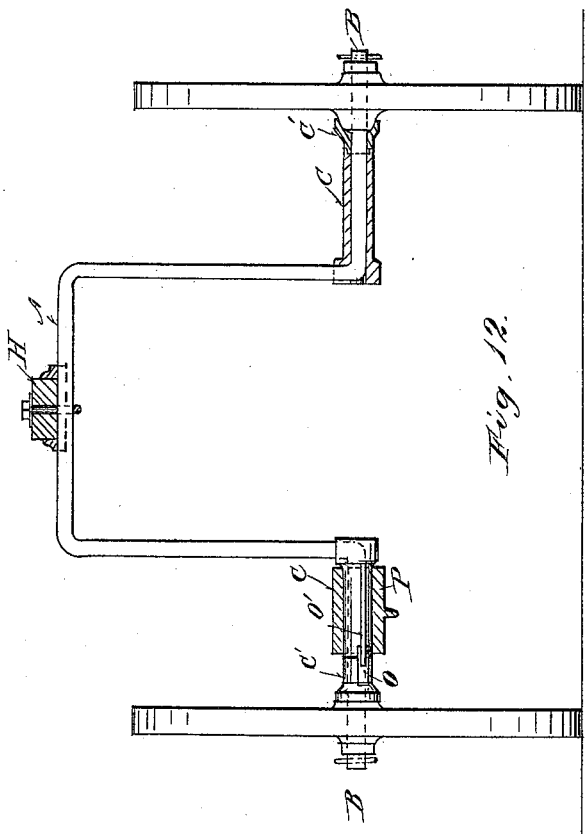
WITNESSES
INVENTOR (No Model.) 4 Sheets—Sheet 4.
A. W. BUTT.
CULTIVATOR.
No. 440,135. Patented Nov. 11, 1890.
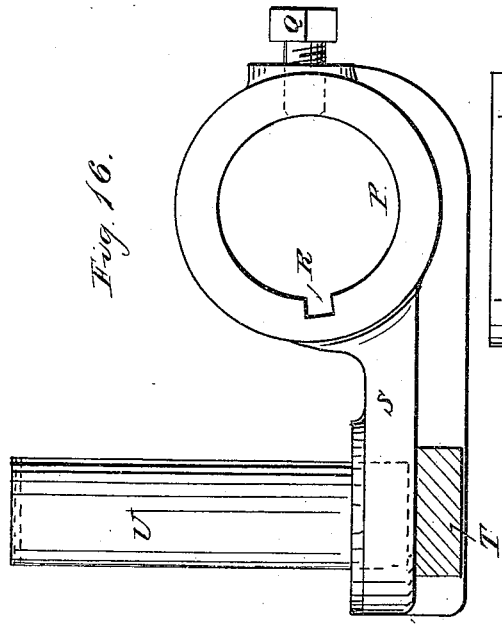
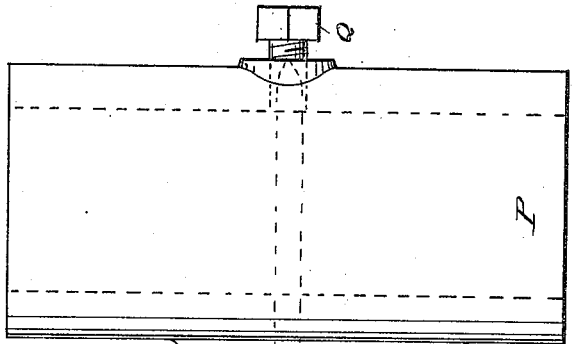
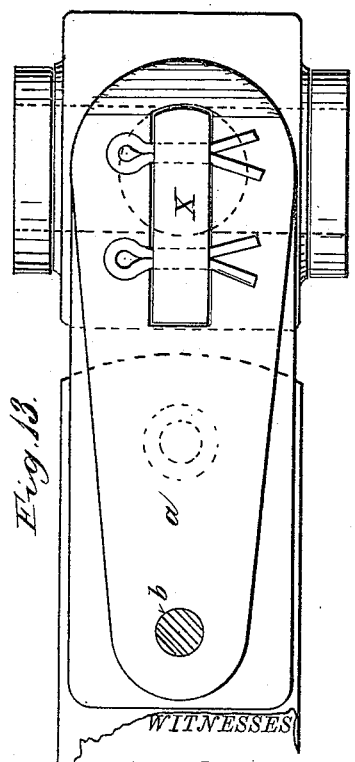
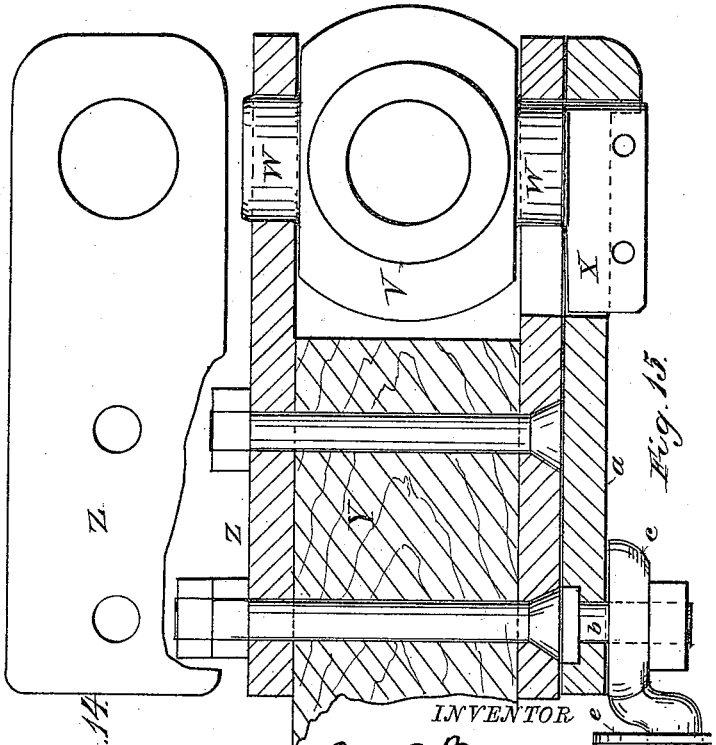
WITNESSES
INVENTOR
A. W. Butt,
By H. A. Toulmin
his Attorney

UNITED STATES PATENT OFFICE.

ADDISON W. BUTT, OF SPRINGFIELD, OHIO.

CULTIVATOR.

SPECIFICATION forming part of Letters Patent No. 440,135, dated November 11, 1890.

Application filed August 16, 1890. Serial No. 362,154. (No model.)

*To all whom it may concern:*

Be it known that I, ADDISON W. BUTT, a citizen of the United States, residing at Springfield, in the county of Clark and State of Ohio, have invented certain new and useful Improvements in Cultivators, of which the following is a specification, reference being had therein to the accompanying drawings.

This invention relates to certain new and useful improvements in cultivators, being of the type or class known as "straddle-row walking cultivators."

My improvements have reference to an improved type of coupling for connecting the forward ends of the beams or drag-bars to the axles; have reference to an improved spring equipment for depressing and raising the beams or drag-bars, or for assisting to depress or raise them, being also adapted merely to raise or assist in raising the beams or drag-bars; have reference to an improved organization or construction for adjusting the spring equipment so as to vary the strength or advantage of the spring in its action upon the beam or drag-bar, and have reference to certain details of construction hereinafter described, and more fully pointed out in the claims.

In the accompanying drawings, forming a part of this specification, and on which like reference-letters indicate corresponding parts, Figure 1 represents a plan view of a cultivator embodying my improvements; Fig. 2, a sectional view showing the handle, the beam, and the cross-head, and their relative positions; Fig. 3, a partial section and side elevation of the cultivator embodying my improvements; Fig. 4, detail views of the devices which enter into the construction of the parallel mechanism; Fig. 5, a detail view of a brace-rod and a cross-beam of the frame; Fig. 6, detail views of the connection between the doubletree and the draft-link; Figs. 7, 8, and 9, detail views of a bushing which forms a part of the coupling; Fig. 10, a partial end and partial sectional view of that part of the bushing shown at Fig. 7; Fig. 11, a sectional view on the line $x\,x$ of Fig. 7; Fig. 12, an elevation of the axle or arch, the wheels, and one of the bushings, and a sectional view of the other bushing and one of the sleeves; Fig. 13, a side elevation in detail of a portion of the coupling; Fig. 14, a detail view of one of the coupling-plates; Fig. 15, a horizontal section of the parts shown in Fig. 13, with the addition of the rod and spring; Fig. 16, a detail side view of the sleeve and pin which form a part of the coupling; Fig. 17, a plan view of the parts shown in Fig. 16, and Fig. 18 a modified plan of securing the pole to the arch.

It is designed to use my improved construction and organization in connection with any approved type of cultivator, particularly of the class known as the "straddle-row walking cultivator." I have illustrated the beams and cross-heads in connection with the devices for producing what is known as the "parallel movement," by which is meant the keeping of the face of the shovels practically in line with the axle, whereby such faces proceed through the soil practically at a right angle to the line of draft. The coupling and the spring equipment herein set forth may be used, however, with a beam of the old type, with which no parallel-movement devices are employed.

The letter A designates an arched axle of the usual type, having lower horizontal portions B, upon which the wheels and the beam-coupling are mounted. My couplings consist of a bushing divided into sections C and C', preferably of cast-iron, adapted to slip over the portions B of the axle, and to interlock one section with the other. The section C is thickened at the inner end and provided with a recess D, which fits about the upright part of the arch and locks the bushing against rotation. A lug E, having an opening, receives one end of a brace-rod F, the other end of which rod is fastened to a cross-beam G, secured to the pole or tongue H of the machine. Thus the bushing is additionally held and the structure braced. By preference the brace-rod F has a jam-nut, as seen at F' in Fig. 5, and also a nut which secures its threaded shank above the beam G, for a purpose hereinafter mentioned. The section C' of the bushing has a lug I, with an opening to receive the draft-rod J, which couples with the draft-link K, secured to the outer ends of the doubletree L by a hook-bolt M, as shown in Fig. 6. One end of the section C' is enlarged to form a sand-box, which extends over to near the end of the hub of the wheel to protect the journal from sand, &c. The other end of the section C' enters the section C, and the two sections are interlocked, as by means of the intermembering of their respective splines O O'. By reference to Fig. 12, it will be seen that the spline O is bifurcated and the spline O' projected into the bifurcation.

The object of dividing the bushing into two sections is to admit of slipping the sleeve P over the bushing, and still have the ends of the bushing enlarged—the one to embrace the vertical part of the arch and the other to form a sand-box. This sleeve has a set-screw Q or other means of fixing it to the bushing and has a seat R to fit over the spline O O'. The sleeve has an extension S, to which is secured by bolts or otherwise the arm T for the alignment-rod, as seen in Figs. 4, 16, and 17. A coupling-pin U extends upwardly from the extension, being secured to it in any desired manner. On this pin is fitted a collar V, preferably of cast-iron, having trunnions W, one of which is flattened and lengthened at its outer end, as seen at X, Figs. 13 and 15. The beam Y has coupling-plates Z bolted to it, and these plates are fitted over the trunnions W, one of them having a slot to permit it to pass the portion X. This beam may have an up-and-down and a sidewise movement—the sleeve V turning on the pin U for the sidewise movement and the plates Z turning on the trunnions W for the up-and-down movement.

Referring now to the spring equipment, the letter $a$ designates a plate or arm having an angular opening, and fitted over the portion X of the trunnion, and held by split keys or otherwise from slipping off. A short bolt or stud $b$ connects the rod $c$ with this plate or arm, and the rod extends back alongside of the beam and passses through a stop and guide $d$ secured to the beam. Between this stop and the collar $e$ on the rod is placed a spiral spring $f$. The center of the bolt $b$ may be adjusted on a horizontal line with the center of the trunnions W, or the plate or arm $a$ may be raised or lowered at its rear end to bring the center of the bolt $b$ above or below the center of the trunnions. In this way the action of the spring on the beam may be varied as regards constituting the spring a lifting and a depressing spring, or merely a lifting-spring; or as regards making the spring begin to lift or begin to depress at different periods in the movement of the beam. When the connection of the rod $c$ with the plate or arm $a$, is in the same horizontal plane as the center of the trunnions W, the spring will act to lift the beam when the part of the beam carrying the stop $d$ is above such line, and will act to depress the beam when such part of it is below the horizontal line. When the connection of the rod and the arm is above the center of the trunnions, then the spring will begin to depress the beam when the stop $d$ is below the center of the bolt $b$, and will begin to lift the beam when the stop $d$ is above the center of the bolt $b$; but in this case the beam will begin to be depressed earlier in its descent, and begin to be elevated later in its ascent than when the center of the bolt $b$ is in the same horizontal line as the center of the trunnion. When the center of the bolt $b$ is below such horizontal line, the spring will begin to lift the beam as soon as the stop $d$ passes above the center of said bolt, and in this case will begin the lifting action earlier in the ascent of the beam than when the center of the bolt $b$ is in line with the center of the trunnions, or above such line. When, however, the bolt is sufficiently below such horizontal line to prevent the stop $d$ from passing below it by reason of the shovels having reached their proper depth in the ground, then in such case the spring will act merely as a lifting-spring, and will not depress the beam at any time.

I am aware that it is not new to so adjust a spring and its rod in connection with a cultivator-beam that it will act to raise and depress the beam or merely act to raise it; and I am also aware that it is not new to depress cultivator-beams by means of springs, independently raising and lowering them or merely raising them. I am not aware, however, that the organization herein set forth by me is other than a novelty.

My means of adjusting the arm or plate $a$, with respect to the center of the trunnions, consists in mounting the pole or tongue H adjustably upon the arch, so that the pole may be projected more or less in advance or to the rear of the arch. This will have the effect of inclining the vertical portion of the arch slightly forward or slightly backward; and inasmuch as the coupling-pin U is rigidly connected with the arch, it will correspondingly incline with the vertical portion of the arch, and hence will throw the rear end of the arm or plate $a$ up or down.

One means of connecting the pole to the axle consists of a shoe $g$ carried by the arch and adapted to receive the pole, and of a U-bolt $h$, embracing the axle and passing through the shoe and a slot $i$ in the pole. Nuts and washers applied to the bolt act to draw the parts strongly together.

To the rear end of the beam is attached a handle $j$ in any convenient way, but preferably by means of a shoe $m$, into which the handle is fitted, and to which it is bolted or riveted, as seen at $o$, the shoe being secured to the beam by the bolts $p$. The shoe may or may not have a slight movement on the beam, but will preferably be rigidly connected with the beam, unless used in connection with my improved guiding and deflecting mechanism, set forth and made the subject of the claims in an application filed by me of even date herewith for improvements in guiding or deflecting mechanism for cultivator-beams.

To the rear end of the beam is pivotally connected, as by a king-bolt $q$, a cross-head $r$, to which is attached some suitable form of cultivator-shovels, preferably a shovel formed of a spring-plate $s$, secured at the upper side of the cross-head and extending backward and curved downward and slightly forward, and fashioned into a suitable shape to constitute a tooth, as seen in Figs. 1 and 3. In order to preserve the parallelism between the faces of these teeth and the axle, as hereinbefore suggested, an alignment-rod $t$ is pivotally connected with the cross-head and with the arm T, hereinbefore described.

The beams, when sufficiently elevated, may be hung on the hooks $v$ by means of the eyes $w$ carried by the beams. The sleeve P may be adjusted laterally on the bushing and held by the set-screw Q. The utility and advantage of a spring to assist in manipulating the beams are well known.

Referring to the connection of the pole to the arch, I would observe that the shoe $g$ may be slotted instead of the pole, and two plates may be used in lieu of the U-bolt, shown in Fig. 3. This substitute construction is shown in Fig. 18.

Referring to adjusting the arch back and forth to effect the adjustment of the arm $a$, I would observe that the nuts which secure the brace-rods F to the cross-beam G may be manipulated to draw the rod up or to force the rod down.

Having thus fully described my invention, what I claim as new, and desire to secure by Letters Patent, is—

1. In a cultivator, the combination, with the axle, a coupling rigidly secured thereto, and a plate or arm carried by the coupling, as $a$, of a beam or drag-bar horizontally and vertically pivoted to said coupling, a rod, as $c$, connected to the plate and slidingly carried by the beam, and a spring acting against the rod and the beam, whereby the beam is elevated or depressed according to the adjustment of the plate.

2. In a cultivator, the combination, with the axle, a coupling rigidly secured thereto, and an arm or plate carried by the coupling, of a beam or drag-bar horizontally and vertically pivoted to the coupling, a rod slidingly carried by the beam and connected to the plate, means to adjust the point of connection between the rod and plate, for the purpose set forth, and a spring acting against the rod and beam to raise and lower the latter according to the adjustment.

3. In a cultivator, the combination, with the axle, a coupling rigidly secured thereto, an arm carried by the coupling and adjustable up and down by varying the position of the axle, and means to vary said position, of a beam horizontally and pivotally connected to the coupling, and a spring and intermediate connections between the beam and arm to lift or depress the beam.

4. In a cultivator, the combination, with the axle, a coupling rigidly secured thereto, a collar vertically pivoted to the coupling and having horizontal trunnions, and a beam or drag-bar pivoted to the trunnions, of an arm rigidly secured to one of the said trunnions, a rod pivoted to the arm and slidingly connected with the beam, and a spring about the rod and acting against it and the beam for lifting or depressing the beam.

5. In a cultivator, the combination, with the axle, a coupling rigidly secured thereto, a pole adjustable back and forth on the arch of the axle to vary the position of the axle, a collar pivotally mounted upon the coupling proper and having trunnions, of a beam or drag-bar pivoted horizontally to said trunnions, an arm rigidly carried by one of the trunnions and adjustable up and down according to the position of the arch, a rod pivoted to the arm and slidingly carried by the beam, and a spring acting on the rod against the beam to lift or depress the beam.

6. In a cultivator, the combination, with an arched axle and a pole secured to the arch and adjustable back and forth thereon, whereby the position of the arch may be varied, of a coupling rigidly secured to the axle and carrying the coupling-pin proper, such pin being adjustable in position by the adjustments of the arch.

7. In a cultivator, the combination, with an axle, of a bushing rigidly secured thereto, a sleeve secured to the bushing against rotation, and having an extension, and a coupling-pin carried by the extension, of a collar pivoted upon the pin and having trunnions, and the beam pivotally connected with said trunnions.

8. In a cultivator, the combination, with a coupling and a vertical pin carried by the coupling, of a collar pivoted upon said pin and having horizontal trunnions, and a beam pivoted upon said trunnions, whereby the beam may be moved both laterally and vertically.

9. In a cultivator, the combination, with the axle, of a divided bushing rigidly secured to the axle with its sections interlocked, and a coupling having a sleeve adapted to fit upon the bushing, and insertible over one section when the other is disengaged from it.

10. In a cultivator, the combination, with the axle and a bushing divided into interlocked sections, one section being recessed to embrace the arch of the axle and having a brace-rod eye, and the other section adapted in part to constitute a sand-box and having a draft-rod-eye, of a coupling proper having a sleeve adapted to fit over the bushing by disengaging the sections.

11. In a cultivator, the combination, with the arched axle, the pole, a transverse beam, and a doubletree, of a brace-rod, a draft-rod, and a bushing fitted upon the axle embracing the arch at one end and connecting with the brace-rod and forming a sand-box at the other end, and connected with the draft-rod.

12. In a cultivator, the combination, with the axle and a bushing rigidly secured thereto, of a coupling proper having a sleeve fitted upon said bushing and secured thereto against rotation, a pivot-pin, a lateral arm carried by the sleeve, a collar on the pin and having trunnions, a beam pivoted to the trunnions, a cross-head pivoted to the beam, and an alignment-rod connecting the cross-head to the lateral beam.

In testimony whereof I affix my signature in presence of two witnesses.

ADDISON W. BUTT.

Witnesses:
   OLIVER H. MILLER,
   WARREN HULL.